United States Patent
Okuhara et al.

(10) Patent No.: US 9,994,187 B2
(45) Date of Patent: Jun. 12, 2018

(54) FOLDING COMPLETION BODY OF HEAD-PROTECTING AIRBAG

(71) Applicant: TOYODA GOSEI CO., LTD., Kiyosu-shi, Aichi-ken (JP)

(72) Inventors: Masaaki Okuhara, Kiyosu (JP); Koji Kawamura, Kiyosu (JP); Yuji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days. days.

(21) Appl. No.: 15/440,379

(22) Filed: Feb. 23, 2017

(65) Prior Publication Data

US 2017/0282842 A1 Oct. 5, 2017

(30) Foreign Application Priority Data

Mar. 29, 2016 (JP) ................. 2016-066477

(51) Int. Cl.
*B60R 21/237* (2006.01)
*B60R 21/213* (2011.01)
*B60R 21/232* (2011.01)
*B60R 21/00* (2006.01)

(52) U.S. Cl.
CPC .......... *B60R 21/237* (2013.01); *B60R 21/213* (2013.01); *B60R 21/232* (2013.01); *B60R 2021/0048* (2013.01)

(58) Field of Classification Search
CPC ... B60R 21/237; B60R 21/213; B60R 21/232; B60R 2021/0048
See application file for complete search history.

(56) References Cited

U.S. PATENT DOCUMENTS

| 6,234,516 B1 * | 5/2001 | Boxey | B60R 21/232 |
| | | | 280/729 |
| 6,361,068 B1 * | 3/2002 | Stein | B60R 21/232 |
| | | | 280/730.2 |
| 6,758,490 B2 * | 7/2004 | Hoeft | B60R 21/232 |
| | | | 280/730.2 |

(Continued)

FOREIGN PATENT DOCUMENTS

| JP | 2004-338542 A | 12/2004 |
| JP | 2010-202187 A | 9/2010 |

(Continued)

*Primary Examiner* — Paul N Dickson
*Assistant Examiner* — Timothy Wilhelm
(74) *Attorney, Agent, or Firm* — Posz Law Group, PLC

(57) ABSTRACT

A folding completion body of a head-protecting airbag includes a compressed portion which is compressed to have a small sectional shape in an axis orthogonal direction in the folding completion body is provided in at least one end in a front and rear direction, wherein: the compressed portion is formed in such a manner that a thin-plate folded portion is disposed by folding back an end periphery in the front and rear direction to be directed to a center in the front and rear direction in a state where the head-protecting airbag is flatly deployed, and a folded-up portion in which the lower periphery is brought close to the upper periphery is provided; and the thin-plate folded portion is configured such that a tip extending from a crease is disposed to be positioned on an end side of the gas guidance path in the front and rear direction.

7 Claims, 13 Drawing Sheets

(56) References Cited

U.S. PATENT DOCUMENTS

| | | | | |
|---|---|---|---|---|
| 7,261,682 B2* | 8/2007 | Crookston | B60R 21/232 | 280/743.1 |
| 7,380,815 B2* | 6/2008 | Rose | B60R 21/213 | 280/728.2 |
| 7,404,790 B2* | 7/2008 | Sugaya | B60R 21/213 | 280/743.1 |
| 7,441,796 B2* | 10/2008 | Noguchi | B60R 21/232 | 280/730.2 |
| 7,641,220 B2* | 1/2010 | Visker | B60R 21/20 | 24/295 |
| 7,766,376 B2* | 8/2010 | Yokoyama | B60R 21/237 | 280/730.2 |
| 7,806,433 B2* | 10/2010 | Mitsuo | B60R 13/0225 | 280/728.2 |
| 7,832,760 B2* | 11/2010 | Mitsuo | B60R 21/232 | 280/729 |
| 8,033,569 B2* | 10/2011 | Yamanishi | B60R 21/232 | 280/728.2 |
| 8,282,124 B2* | 10/2012 | Trovato | B60R 21/232 | 280/730.2 |
| 8,308,192 B2* | 11/2012 | Konishi | B60R 21/213 | 280/730.2 |
| 8,376,397 B2* | 2/2013 | Yamamura | B60R 21/213 | 280/730.2 |
| 8,414,020 B2* | 4/2013 | Beppu | B60R 21/232 | 280/728.2 |
| 8,579,323 B2* | 11/2013 | Kato | B60R 21/213 | 280/729 |
| 8,636,301 B1* | 1/2014 | Wang | B60R 21/232 | 280/730.2 |
| 8,894,094 B2* | 11/2014 | Wang | B60R 21/232 | 280/730.2 |
| 9,145,103 B2* | 9/2015 | Kashio | B60R 21/231 | |
| 9,278,661 B2* | 3/2016 | Jovicevic | B60R 21/213 | |
| 9,409,543 B2* | 8/2016 | Steinbrecher | B60R 21/237 | |
| 9,487,178 B2* | 11/2016 | Kawamura | B60R 21/232 | |
| 9,505,371 B2* | 11/2016 | Kawamura | B60R 21/2334 | |
| 9,566,935 B2* | 2/2017 | Hicken | B60R 21/232 | |
| 9,610,916 B2* | 4/2017 | Kawamura | B60R 21/232 | |
| 2009/0127836 A1* | 5/2009 | Umeda | B60R 21/232 | 280/730.2 |
| 2010/0013203 A1* | 1/2010 | Mitchell | B60R 21/232 | 280/743.2 |
| 2010/0225097 A1 | 9/2010 | Trovato et al. | | |
| 2012/0139215 A1* | 6/2012 | Heuschmid | B60R 21/233 | 280/730.2 |
| 2012/0267880 A1 | 10/2012 | Frisk et al. | | |
| 2014/0239619 A1* | 8/2014 | Fukawatase | B60R 21/232 | 280/730.2 |
| 2015/0151708 A1* | 6/2015 | Kawamura | B60R 21/232 | 280/728.2 |
| 2015/0375710 A1* | 12/2015 | Sievers | B60R 21/237 | 280/730.2 |
| 2016/0001732 A1* | 1/2016 | Asada | B60R 21/232 | 280/729 |
| 2016/0297394 A1* | 10/2016 | Fujiwara | B60R 21/232 | |

FOREIGN PATENT DOCUMENTS

| | | |
|---|---|---|
| JP | 5662471 B2 | 12/2014 |
| WO | 2014/188922 A1 | 11/2014 |

* cited by examiner

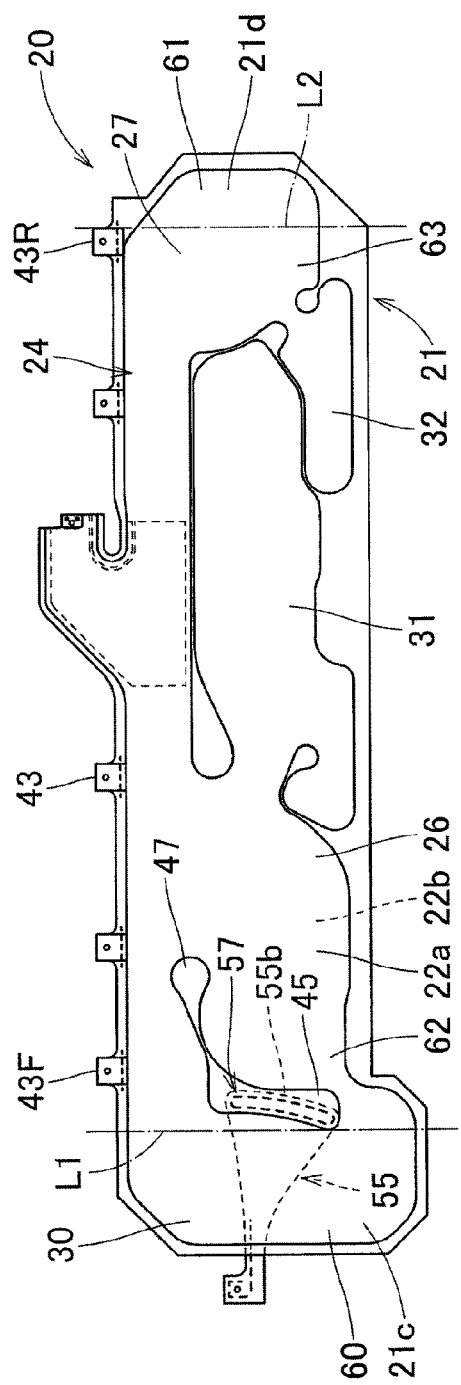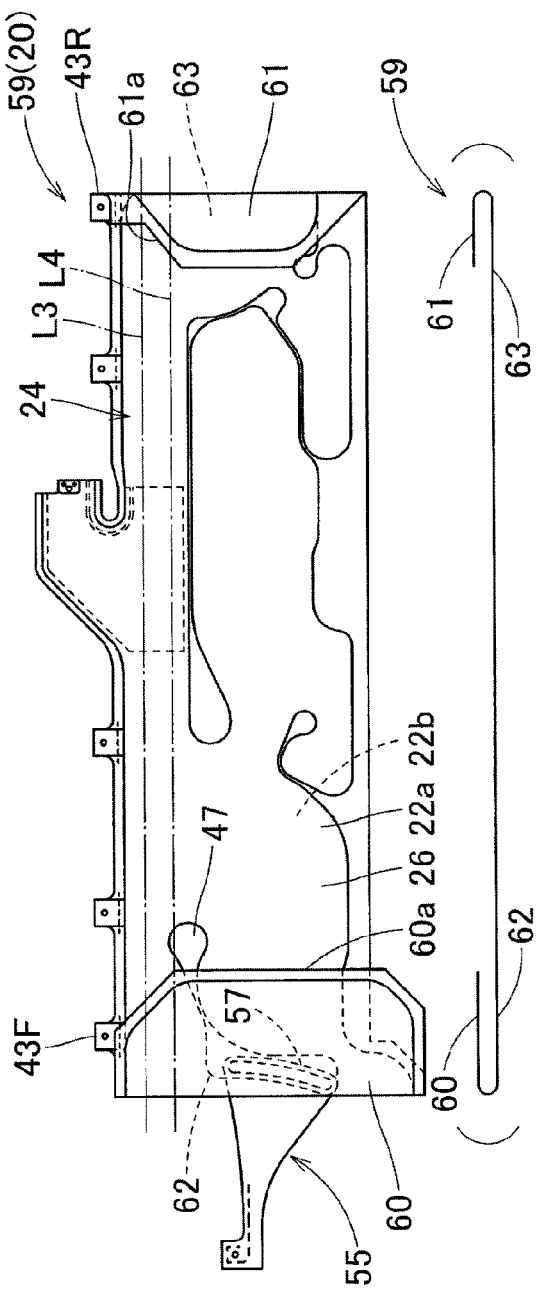
FIG. 5A
FIG. 5B

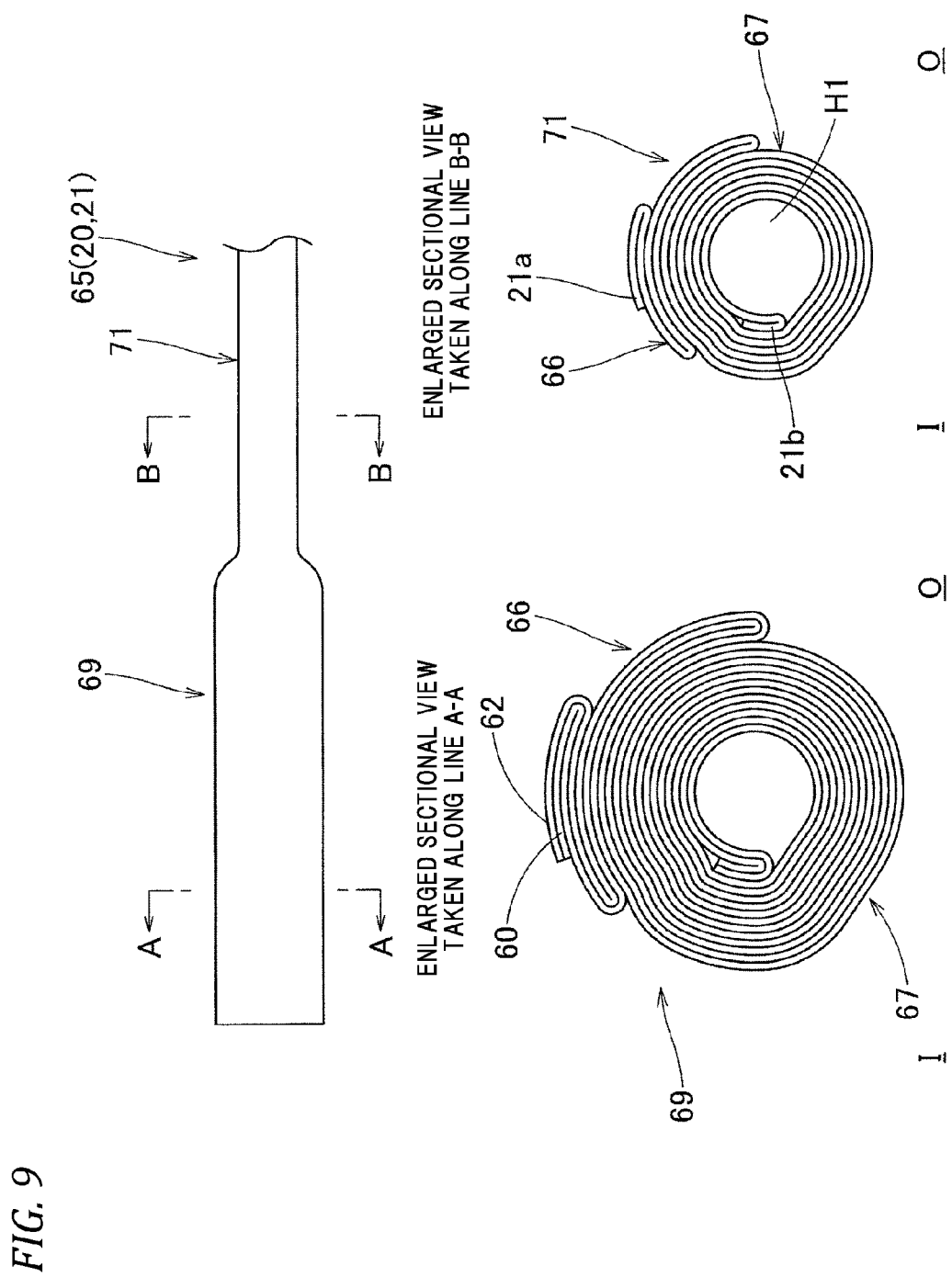

FOLDING COMPLETION BODY OF HEAD-PROTECTING AIRBAG

CROSS-REFERENCE TO RELATED APPLICATION(S)

This application is based upon and claims the benefit of priority from Japanese Patent Application No. 2016-066477, filed on Mar. 29, 2016, the entire contents of which are incorporated herein by reference.

BACKGROUND

1. Field of the Invention

The present invention relates to a folding completion body of a head-protecting airbag formed in such a manner that a head-protecting airbag, which has a bag shape inflatable to cover the inboard side of a window of a vehicle when an inflation gas flows inside, is folded to be storable on the upper peripheral side of the window by bringing a lower periphery close to an upper periphery in a flatly-deployed state.

2. Description of the Related Art

In the related art, a head-protecting airbag device may be configured such that an airbag stored in a folded-up state on the upper peripheral side of the window is partially folded back to shorten a length dimension in a front and rear direction. Specifically, the airbag may be folded in such a manner that one end in the front and rear direction is folded back, and then a lower periphery is brought close to an upper periphery (for example, see U.S. Pat. No. 6,234,516, JP-A2010-202187, and WO 2014/188922 pamphlet). The airbag may be folded in such a manner that the lower periphery is folded to be brought close to the upper periphery, and then one end in the front and rear direction is folded back (for example, see JP-A-2004-338542).

However, in a case where one end of the airbag in the front and rear direction is folded back as described in the above patent documents, the folded area may be bulky, and thus it may be difficult to store the airbag smoothly in the narrow storage space on the upper peripheral side of the window.

In consideration of the smooth storage in the storage space, a folding completion body formed by folding a head-protecting airbag is configured to be pressed and compressed (for example, see Japanese Patent No. 5662471).

However, in the head-protecting airbag described in Japanese Patent No. 5662471, the folding completion body folded in a substantially cylindrical shape is compressed to have an elliptic cylinder shape. Thus, when an area, where the airbag is inflated in the initial inflation of the airbag when an inflation gas from the inflator flows inside, is in a compressed state, the airbag may be not deployed to release the folding smoothly in the initial inflation of the airbag.

SUMMARY

The present invention was made to solve the above-described problem, and an object thereof is to provide a folding completion body of a head-protecting airbag which can be stored smoothly in a narrow storage space by suppressing a partial bulk, and can be deployed to release folding smoothly in the initial inflation although the folding completion body is configured to be stored on the upper peripheral side of a window in a state where at least one end in a front and rear direction is folded back.

According to an aspect of the invention, there is provided a folding completion body of a head-protecting airbag which is formed in such a manner that the head-protecting airbag, which has a bag shape inflatable to cover an inboard side of a window of a vehicle when an inflation gas flows inside, is folded to be storable on an upper peripheral side of the window by bringing a lower periphery close to an upper periphery in a flatly-deployed state, the folding completion body including: a compressed portion which is compressed to have a small sectional shape in an axis orthogonal direction in the folding completion body is provided in at least one end in a front and rear direction, wherein: the head-protecting airbag includes: a protection inflatable portion which covers the inboard side of the window at the time of the inflation completion; and a gas guidance path which is disposed substantially in the front and rear direction on the upper peripheral side at the time of the inflation completion, and guides the inflation gas into the protection inflatable portion; the compressed portion is formed in such a manner that a thin-plate folded portion is disposed by folding back an end periphery in the front and rear direction to be directed to a center in the front and rear direction in a state where the head-protecting airbag is flatly deployed, and a folded-up portion in which the lower periphery is brought close to the upper periphery is provided; and the thin-plate folded portion is configured such that a tip extending from a crease is disposed to be positioned on an end side of the gas guidance path in the front and rear direction.

In the folding completion body of the head-protecting airbag of the present invention, at least one end in the front and rear direction is folded back, and the folded area is compressed to have a small sectional shape in an axis orthogonal direction in the folding completion body. For this reason, although one end of the front and rear direction is configured to be folded back, it can be suppressed that the folded area becomes bulky, and even when the storage space on the upper peripheral side of the window is narrow, the folding completion body can be smoothly stored in the narrow storage space. In the folding completion body of the head-protecting airbag of the present invention, the tip extending from the crease is disposed substantially in the front and rear direction on the upper periphery at the time of the inflation completion, and the thin-plate folded portion forming the compressed portion is configured to be positioned on the end side in the front and rear direction from the gas guidance path which guides the inflation gas into the protection inflatable portion. In other words, in the folding completion body of the head-protecting airbag of the present invention, the gas guidance path is configured not to be superimposed with the compressed thin-plate folded portion in an inboard and outboard direction and to be disposed in a position of being deviated in the front and rear direction. For this reason, in the folding completion body of the head-protecting airbag of the present invention, in the initial inflation of the airbag, first, the gas guidance path which is inflated when the inflation gas flows inside is not compressed. Therefore, in the initial inflation of the airbag, the folding completion body can be inflated while being deployed to release the folding smoothly. The compressed portion disposed in one end of the folding completion body in the front and rear direction is deployed while the folding is released according to the inflation of the gas guidance path. Therefore, the compressed portion can be deployed to release the folding smoothly regardless of the compression.

Therefore, the folding completion body of the head-protecting airbag of the present invention can be stored smoothly in a narrow storage space by suppressing a partial bulk, and can be deployed to release folding smoothly in the initial inflation although the folding completion body is configured to be stored on the upper peripheral side of the window in a state where at least one end in the front and rear direction is folded back.

Further, according to another aspect of the invention, there is provided a folding completion body of a head-protecting airbag which is formed in such a manner that a head-protecting airbag, which has a bag shape inflatable to cover an inboard side of a window of a vehicle when an inflation gas flows inside, is folded to be storable on an upper peripheral side of the window by bringing a lower periphery close to an upper periphery in a flatly-deployed state, the folding completion body including: a compressed portion which is compressed to have a small sectional shape in an axis orthogonal direction in the folding completion body is provided in at least one end in a front and rear direction, wherein: the head-protecting airbag includes; a protection inflatable portion which covers the inboard side of the window at the time of the inflation completion; and a gas guidance path which is disposed substantially in the front and rear direction on the upper peripheral side at the time of the inflation completion, and guides the inflation gas into the protection inflatable portion; the compressed portion includes a rod-shaped folded portion formed by folding back an end periphery of a vertically-shortened folded airbag in which a lower periphery is brought close to an upper periphery; and the rod-shaped folded portion is configured such that a tip extending from a crease is disposed to be positioned on an end side of the gas guidance path in the front and rear direction.

In the folding completion body of the head-protecting airbag of the present invention, the protection inflatable portion may include a main inflatable portion, and a sub inflatable portion which communicates with the main inflatable portion and completes an inflation after the main inflatable portion is completely inflated, the sub inflatable portion may be configured to be disposed in at least one end of the head-protecting airbag in the front and rear direction, and the crease which folds back the thin-plate folded portion or the rod-shaped folded portion may be disposed in an area on an end side of the main inflatable portion in the front and rear direction.

In the above-configured folding completion body of the head-protecting airbag, the crease which folds back the thin-plate folded portion or the rod-shaped folded portion is disposed in an area on an end side of the main inflatable portion in the front and rear direction. In other words, the main inflatable portion is configured not to be folded back, and thus the main inflatable portion can be deployed to release the folding smoothly, and can be inflated quickly.

In the above-configured folding completion body of the head-protecting airbag, the head-protecting airbag may include an airbag body, and a connection member which is made of a sheet material having flexibility and in which a root is coupled to the airbag body and a tip is fixed to a body of the vehicle in a circumferential periphery of the window separate from one end of the airbag body in the front and rear direction, the airbag body may include a partition portion which partitions the sub inflatable portion and the main inflatable portion and is coupled with the root of the connection member, and the compressed portion may include the partition portion coupled with the root of the connection member.

In the above-configured folding completion body of the head-protecting airbag, the coupled portion where the root of the connection member is coupled to the partition portion is compressed. Therefore, it is possible to suppress that the circumferential periphery of the coupled portion disposed to be superimposed becomes bulky in the state of the folding completion body.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 5A and 5B are front views for describing a process to fold the airbag of FIG. 4 to be shortened longitudinally;

FIG. 9 is a schematic view illustrating an airbag folded body folded to be shortened vertically;

DETAILED DESCRIPTION OF THE INVENTION

Figure 1:
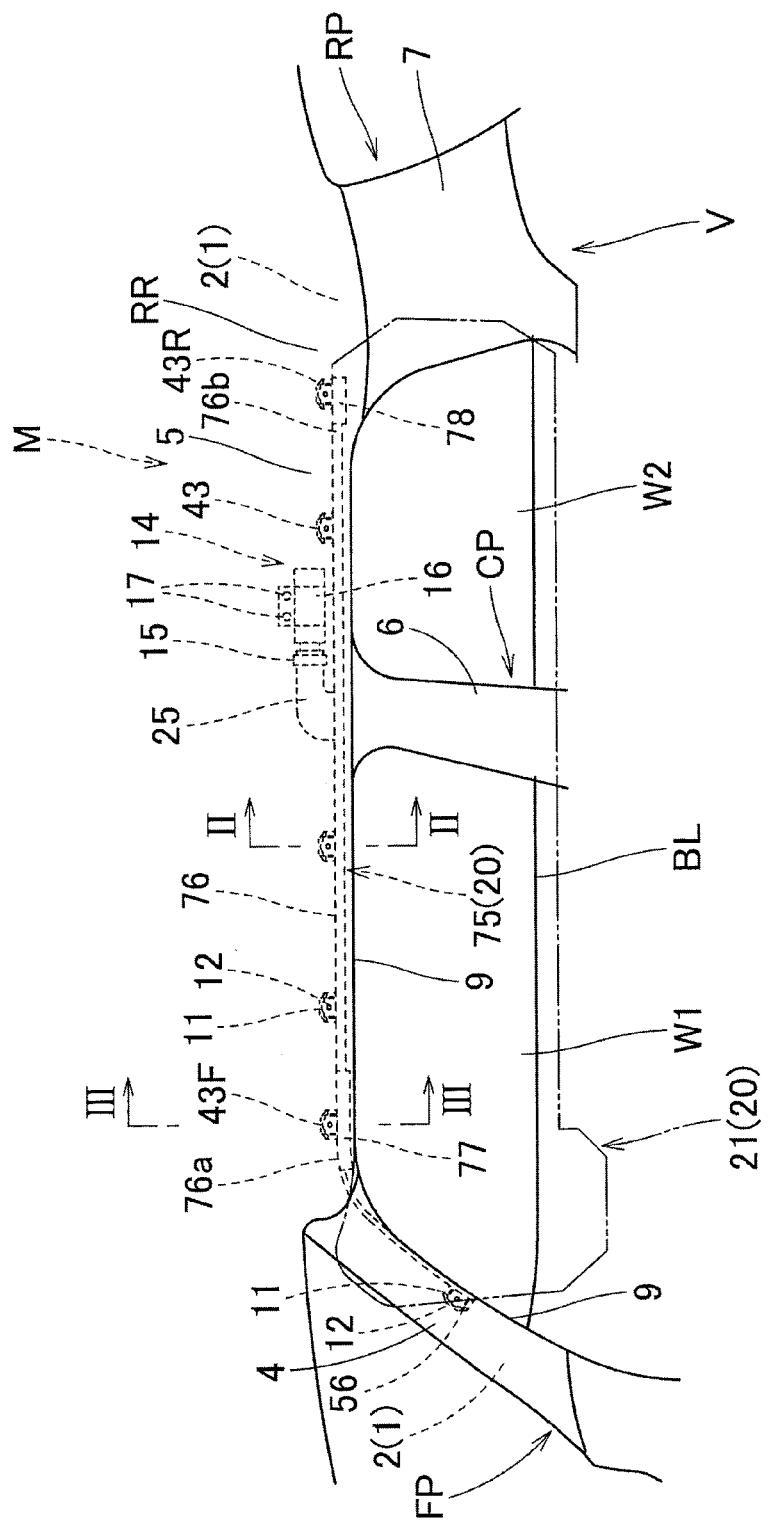
FIG. 1 is a schematic front view illustrating a head-protecting airbag device using a folding completion body of a head-protecting airbag according to one embodiment of the present invention when viewed from an inboard side.
Figure 11:
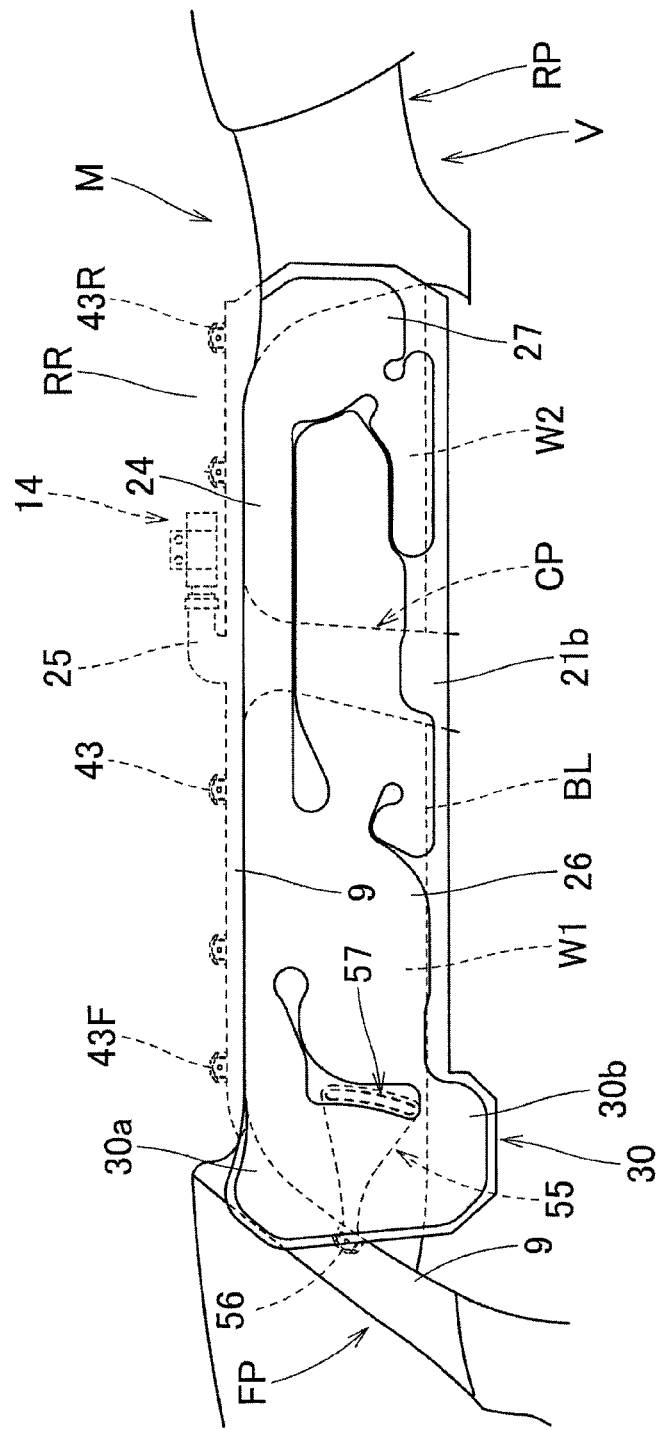
FIG. 11 is a schematic front view illustrating a state where the airbag is completely inflated in the head-protecting airbag device using the folding completion body of the head-protecting airbag of the embodiment when viewed from the inboard side.

Hereinafter, one embodiment of the present invention will be described on the basis of the drawings. A folding completion body 75 of a head-protecting airbag 20 (hereinafter, referred to as 'airbag') is used in a head-protecting airbag device M illustrated in FIG. 1. As illustrated in FIGS. 1 and 11, the head-protecting airbag device M includes the airbag 20, an inflator 14, mounting brackets 11 and 16, and an airbag cover 9. As illustrated in FIG. 1, the airbag 20 is stored as the folding completion body 75 in an area from the lower periphery of a front pillar FP to the upper side of a rear pillar RP through the lower periphery of a roof side rail RR on the upper peripheral side of windows W1 and W2 on the inboard side of a vehicle V. In the embodiment, the airbag 20 is configured to protect the head of an occupant at the time of a side collision or a rollover of the vehicle V.

Figure 2:
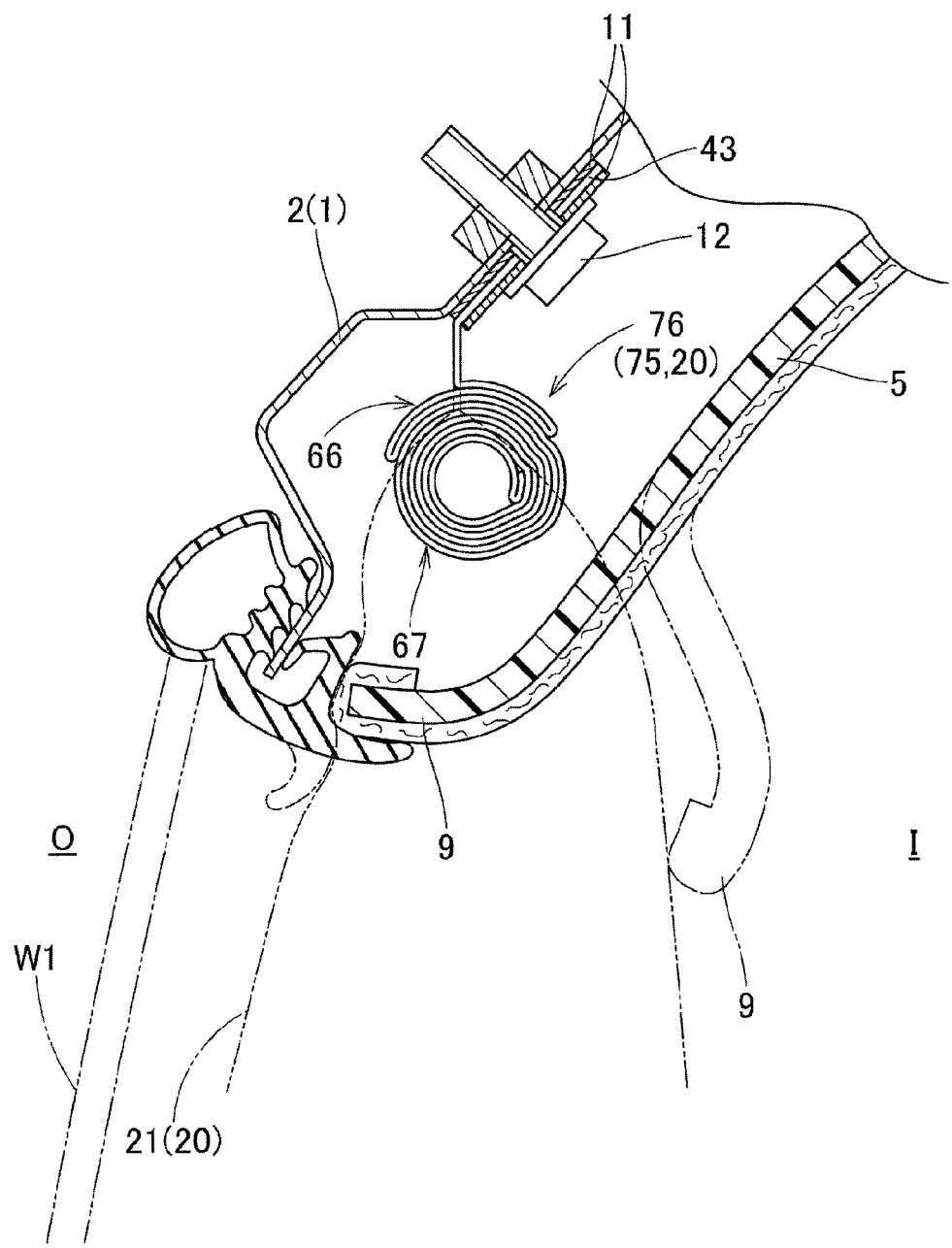
FIG. 2 is a schematic sectional view taken along a line II-II of FIG. 1.
Figure 3:
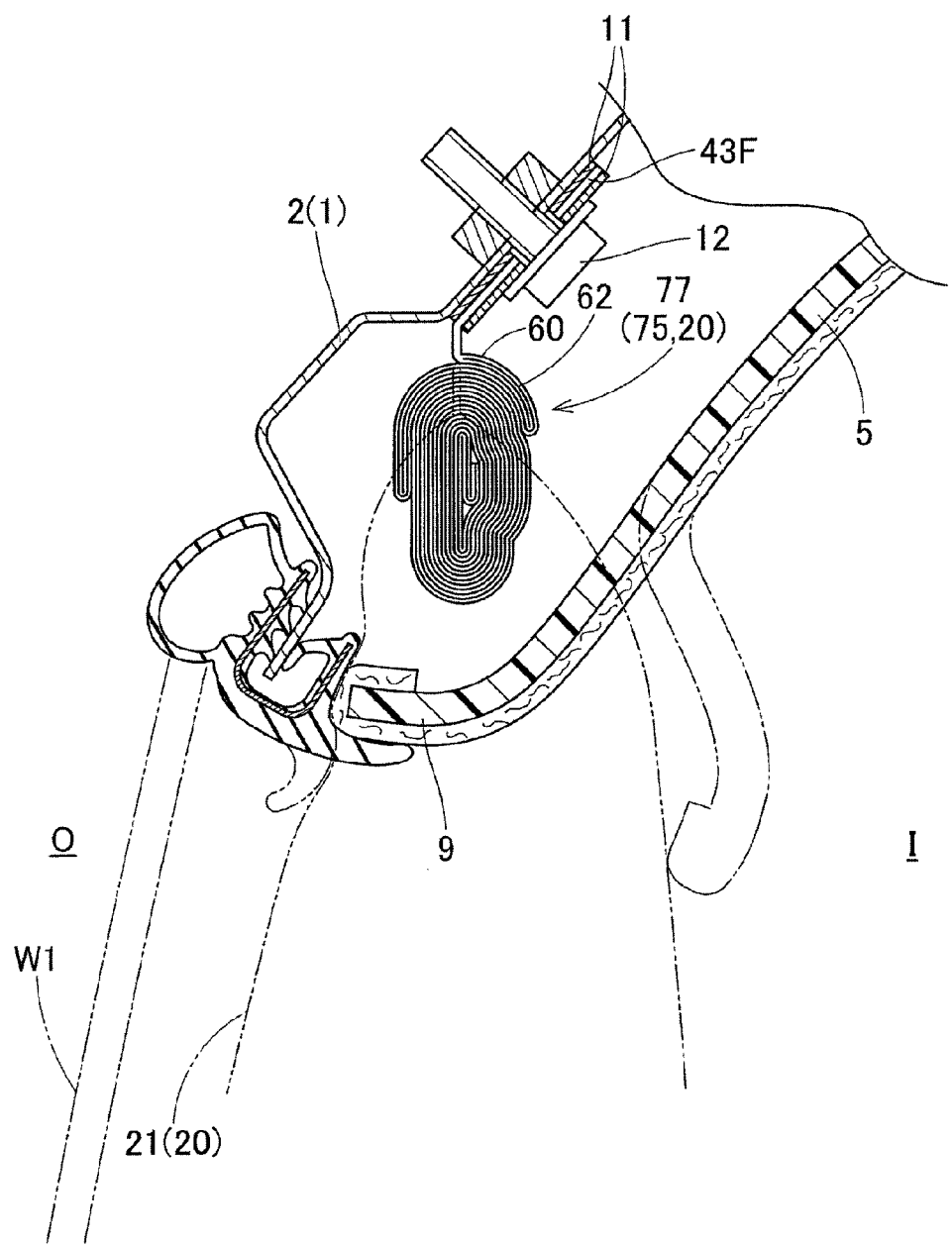
FIG. 3 is a schematic sectional view taken along a line of FIG. 1.

As illustrated in FIGS. 1 to 3, the airbag cover 9 includes a front pillar garnish 4 disposed in the front pillar FP, a roof head liner 5 disposed in the roof side rail RR, and respective lower peripheries thereof. The front pillar garnish 4 and the roof head liner 5 are made of synthetic resin, and are fixedly mounted on an inboard side in an inner panel 2 of a body (vehicle body) 1. As illustrated in FIGS. 2 and 3, the airbag cover 9 is configured to cover an inboard side I of the airbag 20 (folding completion body 75) stored in the folded-up state, and to be pressed by the airbag 20 to be openable to the inboard side so that the airbag 20 can protrude downward on the inboard side when being deployed.

The inflator 14 supplies an inflation gas to the airbag 20. As illustrated in FIG. 1, the inflator is a substantially cylindrical type, and a gas discharge port (not illustrated) which can discharge the inflation gas is disposed on the tip side of the inflator. The tip of the inflator 14 including the vicinity of the gas discharge port is inserted to a gas inflow port 25 (to be described later) of the airbag 20, and the inflator 14 is connected with the airbag 20 by using a clamp 15 disposed on the outer circumferential side of the gas inflow port 25. The inflator 14 is mounted in a position of the inner panel 2 above the window W2 by using the mounting bracket 16 for holding the inflator 14 and a bolt 17 for fixing the mounting bracket 16 to the inner panel 2 of the body 1 (see FIG. 1). The inflator 14 is electrically connected with a control device (not illustrated) of the vehicle V through a lead wire (not illustrated), and is configured to be operated by inputting an operation signal sent from the control device when the control device detects the side collision or a rollover of the vehicle V.

The mounting bracket 11 is formed of a two-sheet metal plate, and nips each of mounting portions 43 and 56 (to be described later) of the airbag 20 from both front and rear sides so as to be mounted on each of the mounting portions. The mounting portions 43 and 56 are fixedly mounted on the inner panel 2 of the body 1 by using a bolt 12. (see FIGS. 1 to 3).

Figure 4:
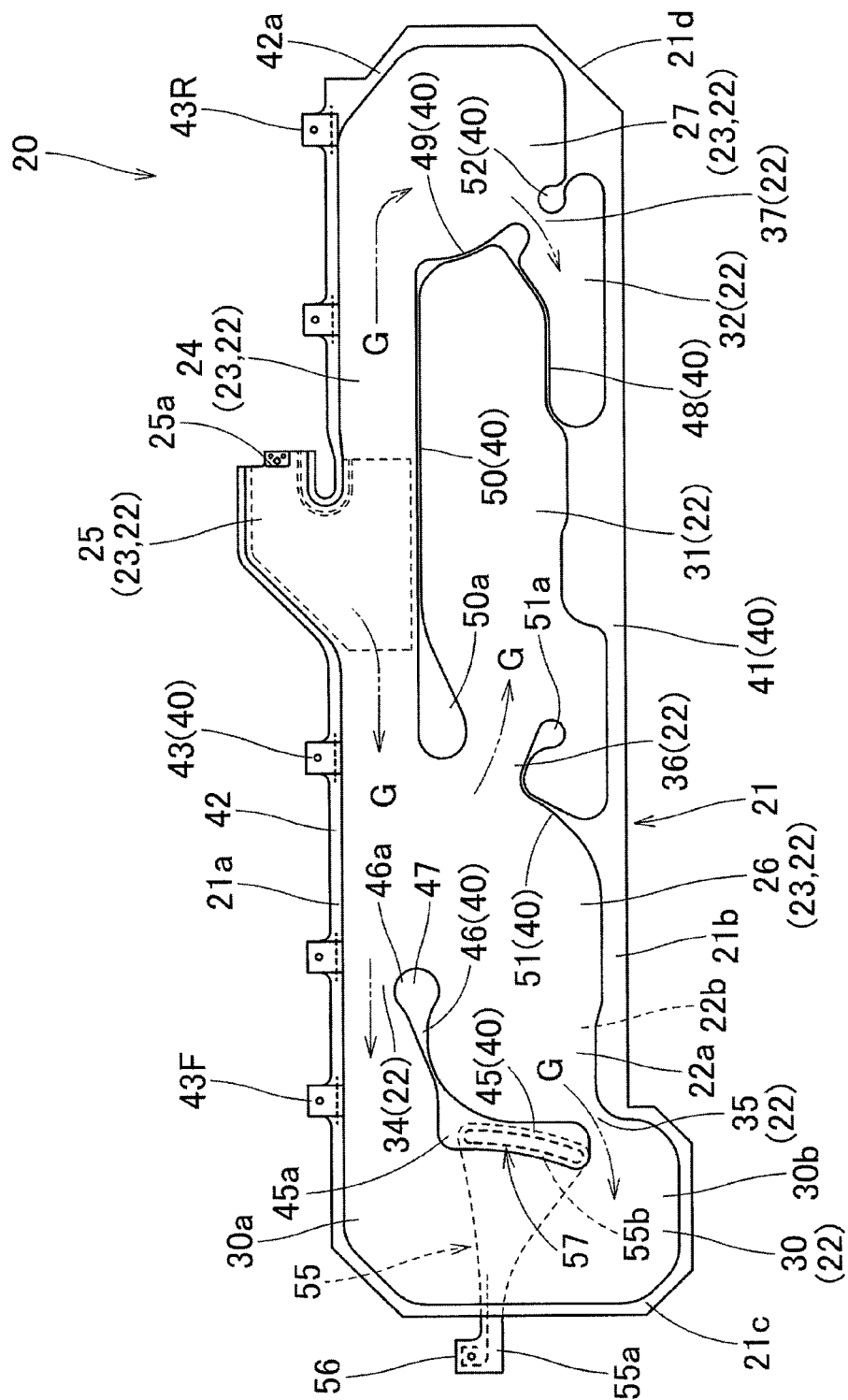
FIG. 4 is a front view illustrating a state where the head-protecting airbag forming the folding completion body of the embodiment is deployed flatly.

As illustrated in a two-dot chain line of FIG. 1 and in FIG. 11, the airbag 20 is configured to be deployed from the folded-up state when the inflation gas from the inflator 14 flows inside, and to cover the windows W1 and W2 and the inboard side of the pillar garnishes 6 and 7 of a center pillar CP and the rear pillar RP. Specifically, the outer shape of the airbag 20 at the time of the inflation completion is set to a substantially rectangular plate shape having a longitudinal direction as a front and rear direction, such that the airbag 20 can cover the inboard side from the window W1 to the front side of the rear pillar RP through the center pillar CP and the window W2. As illustrated in FIG. 11, in the case of the embodiment, a lower periphery 21b at the time of the inflation completion is configured to be positioned below a beltline BL configured from the lower peripheries of the windows W1 and W2. In the case of the embodiment, as illustrated in FIG. 4, the airbag 20 includes an airbag body 21 and a connection member 55 separate from the airbag body 21.

In the case of the embodiment, the airbag body 21 is integrally produced by a double weave made of polyamide, polyester, or the like. As illustrated in FIG. 4, the airbag body 21 includes a gas inflow portion 22, which admits the inflation gas to flow inside such that an inboard side wall 22a positioned on the inboard side and an outboard side wall 22b positioned on the outboard side at the time of the inflation completion are separated to inflate the gas inflow portion, and a non-inflow portion 40 which does not admit the inflation gas to flow inside.

In the case of the embodiment, the gas inflow portion 22 includes a main inflatable portion 23 (primary inflatable portion), which admits the inflation gas discharged from the inflator 14 to flow inside so as to be inflated, a front-side sub inflatable portion 30, a central-side sub inflatable portion 31, and a rear-side sub inflatable portion 32 (secondary inflatable portion), which communicate with the main inflatable portion 23 and complete the inflation after the main inflatable portion 23 is completely inflated, and communicating portions 34, 35, 36, and 37 which allow the main inflatable portion 23, the front-side sub inflatable portion 30, the central-side sub inflatable portion 31, and the rear-side sub inflatable portion 32 to communicate with one another. In the case of the embodiment, in order to smoothly protect the head of the occupant also at the time of the rollover, the airbag body 21 is configured to be inflated when the inflation gas flows inside over about the entire surface except a slight area of partition portions 45, 46, 48, 49, 50, 51, and 52 which partition the main inflatable portion 23, the front-side sub inflatable portion 30, the central-side sub inflatable portion 31, and the rear-side sub inflatable portion 32.

The main inflatable portion 23 includes a gas guidance path 24, the gas inflow port 25, and a front-seat protecting portion 26 and a rear-seat protecting portion 27 as a protection inflatable portion.

The gas guidance path 24 is formed on an upper periphery 21a side of the airbag 20 (airbag body 21) to extend substantially in the front and rear direction. In the case of the embodiment, the gas guidance path 24 is disposed over about the entire area of the main inflatable portion 23 in the front and rear direction. In the initial inflation of the airbag 20, the gas guidance path 24 is configured to guide the inflation gas G discharged from the inflator 14 to the front-seat protecting portion 26 and the rear-seat protecting portion 27 as a protection inflatable portion disposed below the gas guidance path 24. Specifically, the gas guidance path 24 is disposed from the upper side of the latter half portion of the front-seat protecting portion 26 to the upper side of the former half portion of the rear-seat protecting portion 27. In the embodiment, an upper periphery side portion 42 of a circumferential periphery 41 forming the upper periphery 21a of the airbag body 21 is configured to have a tilted portion 42a, of which the rear is tilted downward, on the rear end side. The tilted portion 42a is the rear area of the mounting portion 43R (to be described later), and is disposed in the latter half portion of the rear-seat protecting portion 27. Specifically, the gas guidance path 24 is configured with an area between a swelled portion 47 of the partition portion 46 (to be described later) and the tilted portion 42a. The gas inflow port 25 connected with the inflator 14 communicates with the gas guidance path 24 in a position of the almost center of the gas guidance path 24 in the front and rear direction (a position deviated slightly rearward from the center of the airbag body 21 in the front and rear direction). The gas inflow port 25 is formed to protrude upward from the gas guidance path 24 and to be bent such that a rear end 25a is directed rearward, and the rear end 25a is open such that the inflator 14 can be inserted thereto. The gas inflow port 25 is connected to the inflator 14 by fitting the clamp 15 to the outer circumference in a state where the inflator 14 is inserted thereinto. In the airbag 20 of the embodiment, a separate inner tube (reference numeral omitted) for improving heat resistance is disposed on a portion from the gas inflow port 25 to the gas guidance path 24 directly below the gas inflow port 25 (see FIGS. 4 to 5B)

A front-seat protecting portion 26 as a protection inflatable portion is disposed on the side of the front seat to cover the inboard side of the window W1 at the time of the inflation completion. The front-seat protecting portion 26 protects the head of the occupant seated on the front seat when the airbag 20 (airbag body 21) is completely inflated at the time of the side collision. Specifically, the front-seat protecting portion 26 is configured to cover the inboard side of an area, which is on the rear side of the area where the front pillar FP is disposed on the upper side, in the window W1 on the side of the front seat when the airbag 20 is completely inflated (see FIG. 11). The rear-seat protecting portion 27 as a protection inflatable portion is disposed on the side of the rear seat to cover the inboard side of the window W2 at the time of the inflation completion. The rear-seat protecting portion 27 protects the head of the occupant seated on the rear seat when the airbag 20 (airbag body 21) is completely inflated at the time of the side collision.

The front-side sub inflatable portion 30 is disposed on the front end 21c side of the airbag 20 (airbag body 21) to be adjacent to the front side of the main inflatable portion 23 (front-seat protecting portion 26). In the case of the embodiment, the shape of the front-side sub inflatable portion 30 at the time of the inflation completion is set to a substantially vertical rod shape. As illustrated in FIG. 11, the front-side sub inflatable portion 30 extends downward from the beltline BL, and is configured such that a lower end 30b is positioned below the front-seat protecting portion 26. In addition, the front-side sub inflatable portion 30 is disposed on the front end side, where the front pillar FP vertically tilted rearward and upward, of the window W1 at the time of the inflation completion of the airbag 20. The front-side sub inflatable portion 30 is configured such that an upper end 30a covers the inboard side of the front pillar FP. The front-side sub inflatable portion 30 communicates with the front-seat protecting portion 26 through the communicating portion 34 open to a rear upper end side and the communicating portion 35 open to a rear lower end side. The openings of the communicating portions 34 and 35 are set to have a small width dimension, and thus the inflation gas is delayed to start to flow into the front-side sub inflatable portion 30 compared to the front-seat protecting portion 26.

In the case of the embodiment, the central-side sub inflatable portion 31 is positioned between the front-seat protecting portion 26 and the rear-seat protecting portion 27 in the main inflatable portion 23, and is disposed below the gas guidance path 24. The central-side sub inflatable portion 31 communicates with the front-seat protecting portion 26 through the communicating portion 36 open to the rear end side of the front-seat protecting portion 26. The opening of the communicating portion 36 also is set to have a small width dimension, and thus the inflation gas is delayed to start to flow into the central-side sub inflatable portion 31 compared to the front-seat protecting portion 26. The rear-side sub inflatable portion 32 is disposed in an area between the front lower end of the rear-seat protecting portion 27 and the central-side sub inflatable portion 31. The rear-side sub inflatable portion 32 communicates with the rear-seat protecting portion 27 through the communicating portion 37 open to the front end side of the rear-seat protecting portion 27. The opening of the communicating portion 37 also is set to have a small width dimension, and thus the inflation gas is delayed to start to flow into the rear-side sub inflatable portion 32 compared to the rear-seat protecting portion 27. In the airbag body 21 of the embodiment, the front-side sub inflatable portion 30, the central-side sub inflatable portion 31, and the rear-side sub inflatable portion 32 are configured to cover the inboard side of the windows W1 and W2 at the time of the inflation completion, and form the protection inflatable portion.

The non-inflow portion 40 includes the circumferential periphery 41 forming the outer circumferential periphery of the gas inflow portion 22, the mounting portion 43, and the partition portions 45, 46, 48, 49, 50, 51, and 52 disposed in an area of the gas inflow portion 22.

The circumferential periphery 41 is disposed to surround the entire periphery of the gas inflow portion 22 except the rear end 25a of the gas inflow port 25. In the embodiment, in the circumferential periphery 41, the upper periphery side portion 42 forming the upper periphery 21a of the airbag body 21 includes the tilted portion 42a, of which the rear is tilted downward, on the rear end side. Specifically, the tilted portion 42a is an area on the rear side of the mounting portion 43R disposed on the rear end, and is disposed above the latter half portion of the rear-seat protecting portion 27.

The mounting portion 43 is a portion for mounting the upper periphery 21a of the airbag body 21 on the inner panel 2 of the body 1. As illustrated in FIG. 4, the mounting portions 43 protrude upward from the upper periphery side portion 42 of the circumferential periphery 41 which is the upper periphery 21a of the airbag body 21, and are disposed at plural positions in the front and rear direction. In the case of the embodiment, the total five mounting portions 43 are disposed. Three mounting portions are disposed on the front side of the gas inflow port 25, and two mounting portions are disposed on the rear side of the gas inflow port 25. In the mounting portions 43, the mounting portion 43F disposed in the front end 21c of the airbag body 21 and the mounting portion 43R disposed in a rear end 21d are disposed in an area where compressed portions 77 and 78 are formed (area where thin-plate folded portions 60 and 61 are disposed) in the folding completion body 75 (see FIGS. 1 and 5B). A mounting hole (reference numeral omitted) through which a mounting bolt 12 can be inserted is formed in each of the mounting portions 43.

In order to partition the front-side sub inflatable portion 30 and the front-seat protecting portion 26, the partition portion 45 is configured in a substantially rod shape of extending substantially vertically while both upper and lower ends are separated from the circumferential periphery 41. In the case of the embodiment, the partition portion 45 is formed such that the upper end 45a is positioned below the partition portion 50 (to be described later). The partition portion 46 is formed to protrude rearward from the vicinity of the upper end 45a of the partition portion 45. In the case of the embodiment, the rear of the partition portion 46 is formed to be tilted upward such that the rear end is directed upward while the partition portion 46 swells rearward. The substantially oval swelled portion 47 is formed in a rear end 46a of the partition portion 46. In the partition portion 46, the swelled portion 47 on the rear end 46a side is positioned above the upper end 45a of the partition portion 45, and is disposed in a position of protruding above the partition portion 50. The partition portion 46 is disposed such that an area of the front-seat protecting portion 26 on the front end side is partitioned from the gas guidance path 24, and the area is suppressed from being inflated thickly. In the airbag 20 of the embodiment, the swelled portion 47 of the partition portion 46 is configured to be disposed to protrude above the partition portion 50 forming the lower periphery of the gas guidance path 24. The gas guidance path 24 is configured from an area on the rear side of the swelled portion 47.

The partition portion 48 is disposed in a substantially rod shape of extending from the lower periphery of the circumferential periphery 41 in an obliquely upper rear direction so as to partition the central-side sub inflatable portion 31 and the rear-side sub inflatable portion 32. The partition portion 49 is formed in a substantially rod shape of extending from the lower end of the partition portion 48 in an obliquely upper front direction so as to partition the central-side sub inflatable portion 31 and the rear-seat protecting portion 27. The partition portion 50 is formed to extend forward from the upper end of the partition portion 49 so as to partition the central-side sub inflatable portion 31 and the gas guidance path 24. The partition portion 50 forms the lower periphery of the gas guidance path 24. In the position on the front lower side of the front end portion 50a of the partition portion 50, the partition portion 51 is formed in a substantially reverse V-shape of extending from the lower periphery of the circumferential periphery 41 in an obliquely upper rear direction and being bent such a tip 51a is directed to a lower rear side so as to partition the lower area of the front-seat protecting portion 26 and the lower area of the central-side sub inflatable portion 31. The partition portion 52 is formed to protrude from the lower periphery of the circumferential periphery 41 in an obliquely upper front direction so as to partition the rear-side sub inflatable portion 32 and the rear-seat protecting portion 27. In the airbag 20 of the embodiment, a gap between the swelled portion 47 and the upper periphery side portion 42 in the circumferential periphery 41 forms the communicating portion 34. A gap between the partition portion 45 and a portion of the circumferential periphery 41 on the lower periphery side forms the communicating portion 35. A gap between the front end portion 50a in the partition portion 50 and the partition portion 51 forms the communicating portion 36. A gap between the lower end of the partition portion 49 and the partition portion 52 forms the communicating portion 37.

The connection member 55 separate from the airbag body 21 is formed of a sheet material having flexibility. In the case of the embodiment, the connection member 55 is formed of a woven fabric of polyamide, polyester, or the like. The connection member 55 is configured such that a root 55b is coupled to the airbag body 21, and the tip 55a is fixed to the inner panel 2 of the body 1 of the vehicle V in the circumferential periphery of the window W1 separate from the front end 21c of the airbag body 21, that is, in the embodiment, the inner panel of the body 1 in a portion of the front pillar FP. In the embodiment, the connection member 55 is disposed on the outboard side of the front-side sub inflatable portion 30 at the time of the inflation completion of the airbag body 21. Therefore, the root 55b is sewed (coupled) to the partition portion 45 with a suture. The mounting portion 56 is disposed in the tip 55a of the connection member 55. Similarly with the mounting portion 43 formed in the airbag body 21, the mounting portion 56 is a portion mounted on the inner panel 2 by using the mounting bracket 11 and the mounting bolt 12. The mounting portion 56 includes a mounting hole (reference numeral omitted) through which the mounting bolt 12 can be inserted.

In the case of the embodiment, the connection member 55 is formed in substantially fan shape of being widely open from the mounting portion 56 on the tip 55a side (front end side) to the root 55b side (rear side). The rear periphery serving as the root 55b is sewed to the partition portion 45 which partitions the front-side sub inflatable portion 30 and the front-seat protecting portion 26 in the airbag body 21. The suturing portion 57 which couples the root 55b of the connection member 55 to the partition portion 45 is formed over almost the entire vertical area in the rear periphery of the connection member 55. The suturing portion 57 has a substantially vertically long shape.

Next, the description will be given about installing the head-protecting airbag device M of the embodiment on the vehicle V. First, the airbag 20 is folded up. In the embodiment, first, the airbag body 21 in the state of being flatly deployed such that the inboard side wall 22a and the outboard side wall 22b are overlapped is folded to shorten a width dimension in the front and rear direction so as to form a longitudinally-shortened folded airbag 59. Thereafter, the longitudinally-shortened folded airbag 59 is folded to shorten a vertical width dimension so as to form an airbag folded body 65. Specifically, as illustrated in FIGS. 5A and 5B, first, a portion of the airbag body 21 on the front end 21c side is folded back to be overlapped with the adjacent inboard side wall 22a of the folding target portion 62 by attaching a substantially vertical crease L1 in the front-end area of the front-seat protecting portion 26 as the main inflatable portion 23, specifically, in a position of the front-side sub inflatable portion 30 in the vicinity of the front side of the partition portion 45, thereby forming the thin-plate folded portion 60. Similarly, a portion of the airbag body 21 on the rear end 21d side is folded back to be overlapped with the adjacent inboard side wall 22a of the folding target portion 63 by attaching a substantially vertical crease L2 in the rear-seat protecting portion 27, specifically, in a position in the vicinity of the rear periphery of the mounting portion 43R disposed on the rear side, thereby forming the thin-plate folded portion 61. Therefore, the longitudinally-shortened folded airbag 59 is formed.

In the longitudinally-shortened folded airbag 59, the thin-plate folded portion 60 formed on the front side is configured such that the tip 60a extending from the crease L1 is disposed in a position of being deviated forward from the gas guidance path 24. Specifically, as illustrated in FIG. 5B, the tip 60a of the thin-plate folded portion 60 is disposed in a position in the vicinity of the front end of the swelled portion 47 formed in the partition portion 46. In the thin-plate folded portion 61 formed on the rear side of the longitudinally-shortened folded airbag 59, the upper-end area serving as the gas guidance path 24 side is configured from the tilted portion 42a formed in the upper periphery side portion 42 in the circumferential periphery 41. That is, as illustrated in FIG. 5B, in the thin-plate folded portion 61, the front area of the upper periphery 61a (tip) is tilted downward such that the upper periphery 61a is positioned to be deviated rearward from the gas guidance path 24. Therefore, the thin-plate folded portion 61 is configured almost not to be overlapped with an area of the gas guidance path 24 on the rear end side. That is, the thin-plate folded portions 60 and 61 are configured to be disposed in a position of being deviated from the gas guidance path 24 in the front and rear direction.

Figures 6A, 6B, 6C:
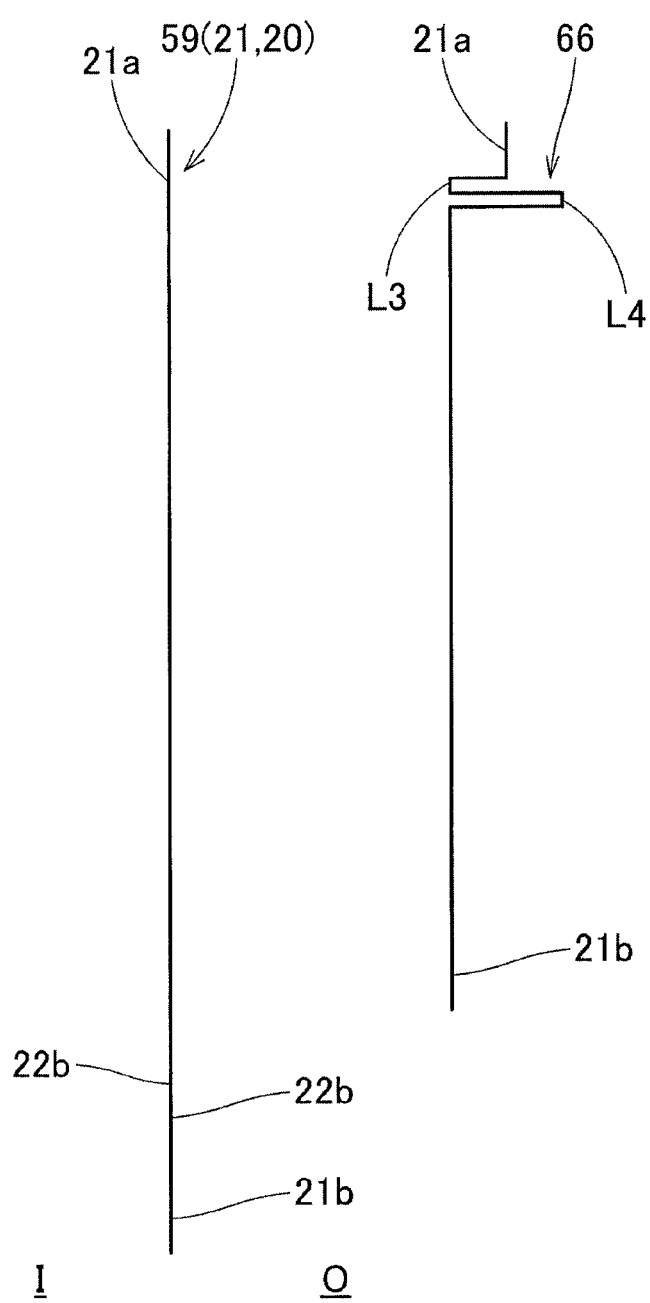
FIGS. 6A to 6C are views for describing a schematic folding process to fold the airbag to be shortened vertically after being folded to be shortened longitudinally.
Figure 7A:
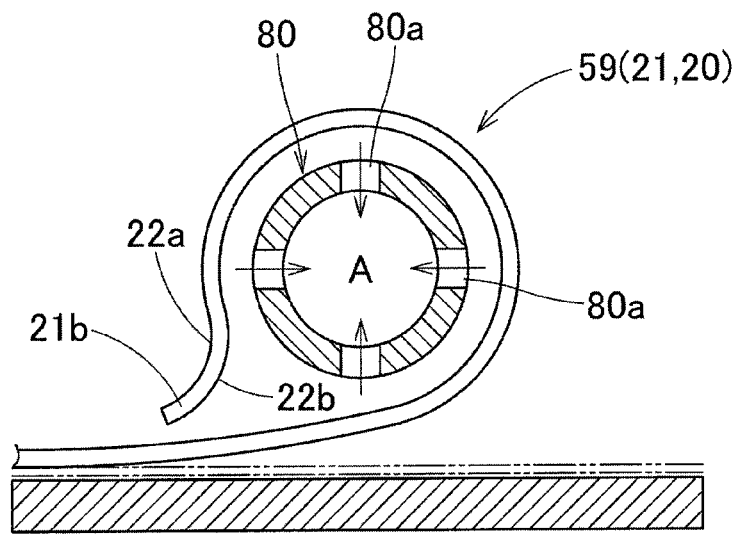
FIGS. 7A and 7B are schematic views illustrating a state where the longitudinally-shortened folded airbag is wound around a winding core in the folding process to fold the airbag to be shortened vertically.
Figure 7B:
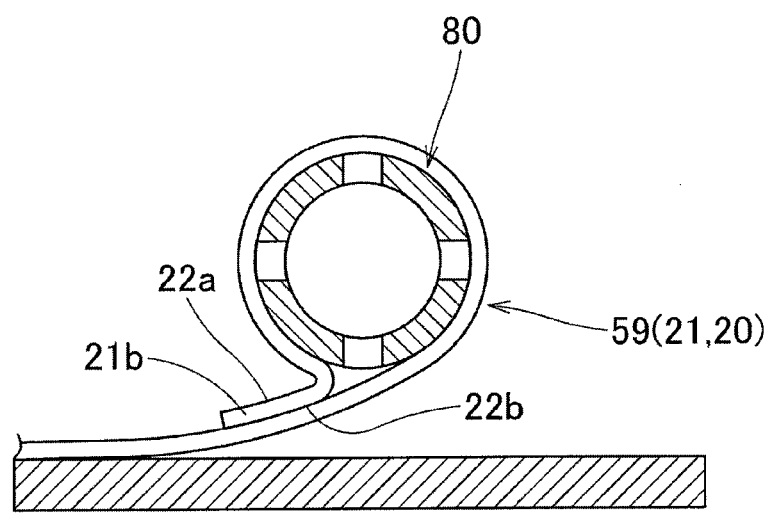
Figure 8A:
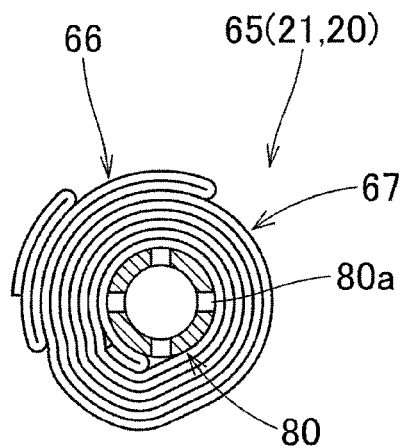
FIGS. 8A and 8B are schematic views illustrating a state where the winding core is taken off from a roll-folded airbag in the vertically-shortened folded airbag.
Figure 8B:
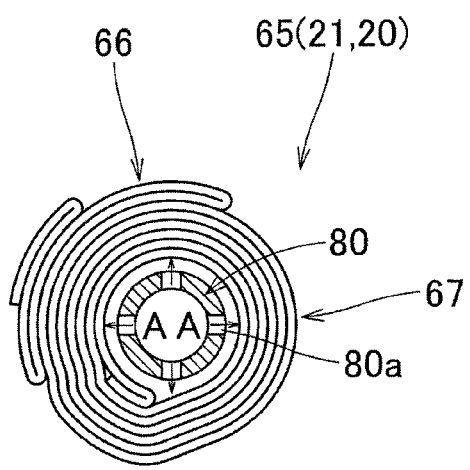

Next, the longitudinally-shortened folded airbag 59 is folded up to shorten a vertical width dimension. Specifically, in the embodiment, as illustrated in FIG. 5B, the longitudinally-shortened folded airbag 59 is folded in a bellows manner by folding a portion of the gas guidance path 24 on the upper periphery 21a side by using two creases L3 and L4 disposed substantially in the front and rear direction. An area on the lower side of the gas guidance path 24 is roll-folded such that a lower periphery 21b is wound toward an outboard side O in a state where the inboard side wall 22a and the outboard side wall 22b are overlapped, whereby the longitudinally-shortened folded airbag 59 is folded up (see FIGS. 6A to 6C). When describing the folding method more specifically, first, the longitudinally-shortened folded airbag 59 is folded in portions of the creases L3 and L4 by using a folding plate (not illustrated) and attaching two creases L3 and L4 substantially in the front and rear direction (see FIGS. 5B and 6B) in a portion of the gas guidance path 24, thereby forming a bellows-folded portion 66. A roll-folded portion 67 is formed at about the same time as the formation of the bellows-folded portion 66. As illustrated in FIGS. 7A and 7B, in the embodiment, the roll-folded portion 67 is formed by using a long and cylindrical winding core 80 provided with a plurality of air intake holes 80a which can suck an air A. Specifically, as illustrated in FIGS. 7A and 7B, the winding core 80 is disposed on the surface, on the outboard side wall 22b side, of the lower periphery 21b of the longitudinally-shortened folded airbag 59 in the state of being flatly deployed such that the inboard side wall 22a and the outboard side wall 22b are overlapped. While the air A is sucked from the air intake hole 80a to adsorb the airbag body 21 (longitudinally-shortened folded airbag 59) in the outer circumferential surface of the winding core 80, the winding core 80 is rotated to wind a portion of the airbag body 21 on the lower periphery 21b side around the winding core 80 (see FIG. 8A). Thereafter, as illustrated in FIG. 8B, while the air A is discharged from the air intake hole 80a to form a slight gap between the winding core 80 and the airbag body 21, the winding core 80 is pulled out. Therefore, the roll-folded portion 67 can be formed beneath the bellows-folded portion 66 to form the airbag folded body 65. As illustrated in FIG. 9, a hollow H1 of the volume of the winding core 80 is generated in the center of the roll-folded portion 67. In the airbag folded body 65, as illustrated in FIG. 9, an area where the thin-plate folded portion 60 is disposed, that is, a preset compression portion 69 is folded up in a state where the thin-plate folded portion 60 and the folding target portion 62 are overlapped. Therefore, the preset compression portion 69 becomes bulky such that an outer diameter dimension thereof is two times as large as that of a general portion 71 in the middle of the front and rear direction. The preset compression portion 70 on the rear end is the same as above (not illustrated).

Figure 10A:
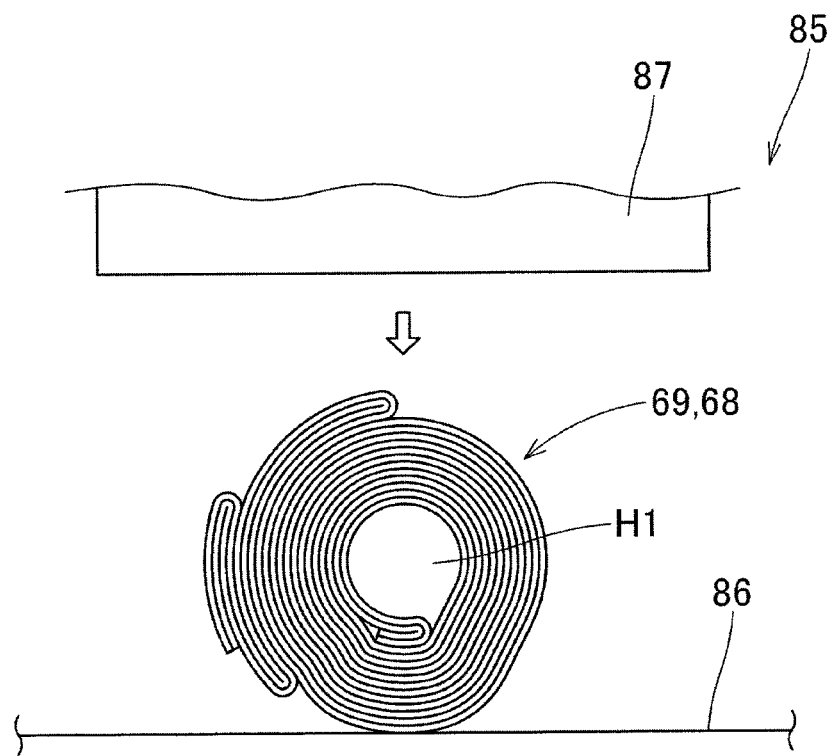
FIGS. 10A and 10B are schematic views illustrating a process to form a compressed portion in the airbag folded body in the folding process of the airbag.
Figure 10B:
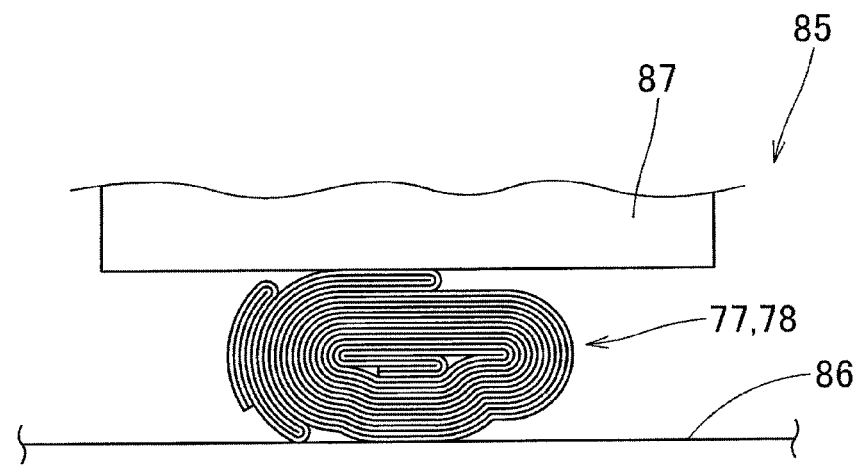

Next, areas (preset compression portions 69 and 70) where the thin-plate folded portions 60 and 61 are disposed on the front end side and the rear end side of the airbag folded body 65 are subject to a heat-compressing process by using an airbag heat-compressing machine 85. Specifically, in the case of the embodiment, as illustrated in FIGS. 10A and 10B, in the airbag folded body 65, an area where the thin-plate folded portions 60 and 61 are disposed (preset compression portions 69 and 70) is laterally loaded on a loading table 86 of the airbag heat-compressing machine 85 to contact with the inboard side surface or the outboard side surface (inboard side surface in the case of the embodiment) of the roll-folded portion 67. A press plate 87 is pressed from above to compress the preset compression portions 69 and 70, and a heater (not illustrated) is used to apply heat for a predetermined time, thereby forming the compressed portions 77 and 78. While the hollow H1 in the center of the roll-folded portion 67 is broken, the compressed portions 77 and 78 are flatly broken vertically such that a width dimension in a right and left direction (inboard and outboard direction) is shortened. Therefore, the compressed portions 77 and 78 are formed to have a small sectional shape in an axis orthogonal direction compared to that before processing. Specifically, in the case of the embodiment, the compressed portions 77 and 78 are compressed to have a sectional area seven tenths times as large as the preset compression portions 69 and 70. At the time of heat-compressing, a base material (inboard side wall 22a and outboard side wall 22b) themselves forming the airbag body 21 are also compressed to be thinner than a base material (inboard side wall 22a and outboard side wall 22b) forming a main body 76 of the folding completion body 75 not subject to the compressing process. The airbag heat-compressing machine 85 raises the temperature of the airbag folded body 65 to about 100° C., and is configured to compress at a predetermined pressing force.

Thereafter, when the formed compressed portions 77 and 78 are cooled with the compressed state maintained by using an airbag cool-compressing machine (not illustrated), the folding completion body 75 can be formed. That is, in the folding completion body 75, in a state where the airbag 20 (airbag body 21) is flatly deployed, the front end 21c and the rear end 21d are folded back to be directed to the center in the front and rear direction so that the thin-plate folded portions 60 and 61 are disposed. Then, the compressed portions 77 and 78 is formed by providing a folded-up portion (bellows-folded portion 66 and roll-folded portion 67) in which the lower periphery 21b is brought close to the upper periphery 21a. After the folding completion body 75 is formed, a breakable wrapping material (not illustrated) for preventing folding-collapse surrounds a predetermined position around the folding completion body 75.

Thereafter, the inflator 14 mounted with the mounting bracket 16 is connected with the gas inflow port 25 of the airbag 20 by using the clamp 15, and the mounting bracket 11 is fixed to each of the mounting portions 43 and 56, thereby forming an airbag assembly.

Next, the mounting brackets 11 and 16 are disposed at predetermined positions of the inner panel 2 of the body 1, and the lead wire (not illustrated), which extends from the predetermined control device for operating the inflator, is connected to the inflator 14 by fixing the bolts 12 and 16. The front pillar garnish 4 and the roof head liner 5 are mounted on the inner panel 2 of the body 1, and further, the pillar garnishes 6 and 7 are mounted on the inner panel 2 of the body 1. Thus, the head-protecting airbag device M can be installed on the vehicle V. When being installed on the vehicle V, the main body 76 formed by folding the airbag body 21 in the folding completion body 75 is shortened in the width dimension in the front and rear direction compared to the airbag body 21 at the time of the inflation completion. As illustrated in FIG. 1, the main body 76 is disposed in area from the rear side of the front pillar FP to the front side of the rear pillar RP on the lower side of the roof side rail RR. In other words, the main body 76 of the folding completion body 75 is stored on the upper peripheral side of the windows W1 and W2 in the state of suppressing entrance into the front pillar FP and entrance into the upper area of the rear pillar RP.

After the head-protecting airbag device M is installed on the vehicle V, if an operation signal sent from the control device is received to operate the inflator 14 at the time of the side collision or the rollover of the vehicle V, the inflation gas discharged from the inflator 14 flows into the airbag 20 (airbag body 21). The inflating airbag 20 (airbag body 21) breaks the wrapping material (not illustrated), presses and opens the airbag cover 9 configured from the lower peripheries of the front pillar garnish 4 and the roof head liner 5, and protrudes downward while the airbag is deployed such that the folding is released. As illustrated in the two-dot chain line of FIG. 1, and in FIG. 11, the airbag body 21 is largely inflated to cover the inboard side of the windows W1 and W2, the central pillar CP, and the portion of the rear pillar RP.

In the folding completion body 75 used in the head-protecting airbag device M of the embodiment, the main body 76 formed by folding the airbag body 21 is configured such that the front end 76a and the rear end 76b are folded back, and the folded area (compressed portions 77 and 78) is compressed to have a small sectional shape in the axis orthogonal direction in the folding completion body 75. For this reason, as illustrated in FIGS. 2 and 3, although the front end and the rear end are configured to be folded back, it can be suppressed that the folded area becomes bulky, and even when the storage space on the upper peripheral side of the windows W1 and W2 is narrow, the folding completion body can be smoothly stored in the narrow storage space. In the folding completion body 75 of the airbag 20 of the embodiment, the tip 60a and the upper periphery 61a extending from the creases L1 and L2 are disposed substantially in the front and rear direction on the upper periphery at the time of the inflation completion, and the thin-plate folded portions 60 and 61 forming the compressed portions 77 and 78 are configured to be positioned on the end sides in the front and rear direction from the gas guidance path 24 which guides the inflation gas into the front-seat protecting portion 26 and the rear-seat protecting portion 27 as protection inflatable portions. In other words, in the folding completion body 75 of the airbag 20 of the embodiment, the gas guidance path 24 is configured not to be superimposed with the compressed thin-plate folded portions 60 and 61 in an inboard and outboard direction and to be disposed in a position of being deviated in the front and rear direction. For this reason, in the folding completion body 75 of the airbag 20 of the embodiment, in the initial inflation of the airbag 20 (airbag body 21), first, the gas guidance path 24 which is inflated when the inflation gas flows inside is not compressed. Therefore, in the initial inflation of the airbag 20, the gas guidance path 24 can be inflated while being deployed to release the folding smoothly. The compressed portions 77 and 78 disposed in the front end 71a and the rear end 71b of the folding completion body 75 are deployed while the folding is released according to the inflation of the gas guidance path 24. Therefore, the compressed portions 77 and 78 can be deployed to release the folding smoothly regardless of the compression.

Therefore, the folding completion body 75 of the airbag 20 of the embodiment can be stored smoothly in a narrow storage space by suppressing a partial bulk, and can be deployed to release folding smoothly in the initial inflation although the folding completion body is configured to be stored on the upper peripheral side of the windows W1 and W2 in a state where the front end and the rear end are folded back.

In the airbag 20 of the embodiment, the airbag body 21 includes the main inflatable portion 23, and the front-side sub inflatable portion 30, the central-side sub inflatable portion 31, and the rear-side sub inflatable portion 32 which communicate with the main inflatable portion 23 and complete the inflation after the main inflatable portion 23 is completely inflated. When the airbag 20 is folded up, the crease L1 which folds back the thin-plate folded portion 60 is configured to be disposed in the front-end area of the front-seat protecting portion 26 as the main inflatable portion 23, that is, in an area of the front-side sub inflatable portion 30 disposed on the front-end side of the airbag body 21 in the case of the embodiment. (see FIG. 5A). That is, in the folding completion body 75 of the airbag 20 of the embodiment, the crease L1 which folds back the thin-plate folded portion 60 is configured not to be disposed in the front-seat protecting portion 26 as the main inflatable portion 23 disposed adjacent to the front-side sub inflatable portion 30. In other words, the front-seat protecting portion 26 is configured not to be folded back. For this reason, in the initial inflation of the airbag 20, the front-seat protecting portion 26 can be deployed to release the folding smoothly, and can be inflated quickly.

The airbag 20 of the embodiment includes the airbag body 21, and the connection member 55 separate from the airbag body 21. The root 55b of the connection member 55 is configured to be coupled to the partition portion 45 which partitions the front-side sub inflatable portion 30 and the front-seat protecting portion 26 in the airbag body. As illustrated in FIG. 5A, the partition portion 45 is disposed in an area of the folding target portion 62 overlapped with the thin-plate folded portion 60. That is, in the folding completion body 75, the compressed portion 77 includes the partition portion 45. For this reason, in the folding completion body 75 of the airbag 20 of the embodiment, the coupled portion (suturing portion 57) where the root 55b of the connection member 55 is coupled (sewed) to the partition portion 45 is compressed. Therefore, it is possible to suppress that the circumferential periphery of the suturing portion 57 disposed to be superimposed becomes bulky in the state of the folding completion body 75. Particularly, in the embodiment, the suturing portion 57 which sews the root 55b of the connection member 55 in the partition portion 45 has a substantially vertically long shape. In the state of the folding completion body 75 formed by folding the airbag body 21 such that the lower periphery 21b is brought close to the upper periphery 21a, the suturing portion 57 (a suture itself forming the suturing portion 57) is disposed to be overlapped with each other. However, by compressing, it can be suppressed that the suturing portion 57 disposed to be superimposed becomes bulky.

Figure 12A:
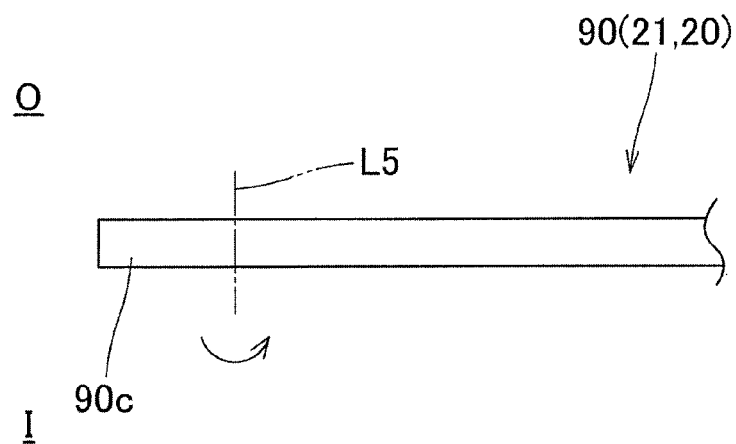
FIGS. 12A to 12C are schematic views for describing a process to fold the airbag to form another folding completion body.
Figure 12B:
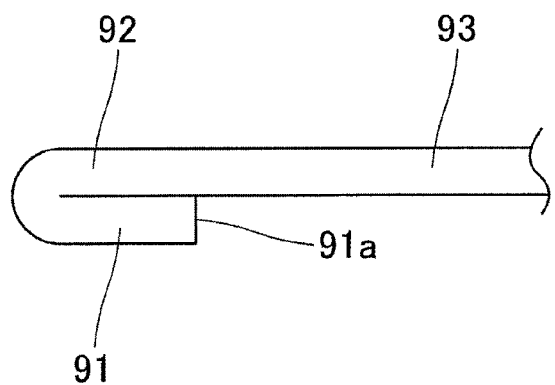
Figure 12C:
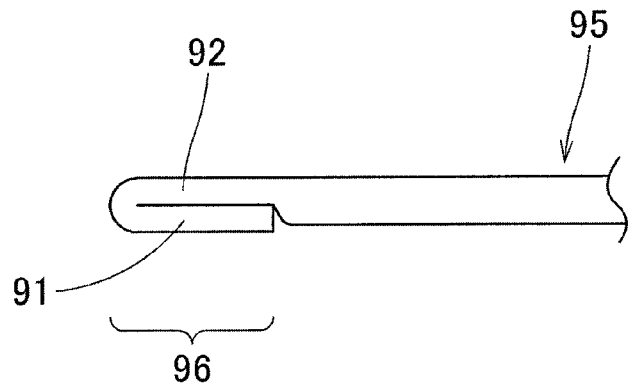

In the embodiment, after being folded to shorten the width dimension in the front and rear direction, the airbag body 21 of the airbag 20 is folded to shorten the vertical width dimension. However, as illustrated in FIGS. 12A to 13B, the folding completion body 95 may be formed in such a manner that the airbag 20 is folded to shorten the width dimension in the front and rear direction after being folded to shorten the vertical width dimension. FIGS. 12A to 12C illustrate a process to fold the front end of the airbag 20 (airbag body 21) as an example, but the rear end may be folded in the same manner.

Figure 13A:
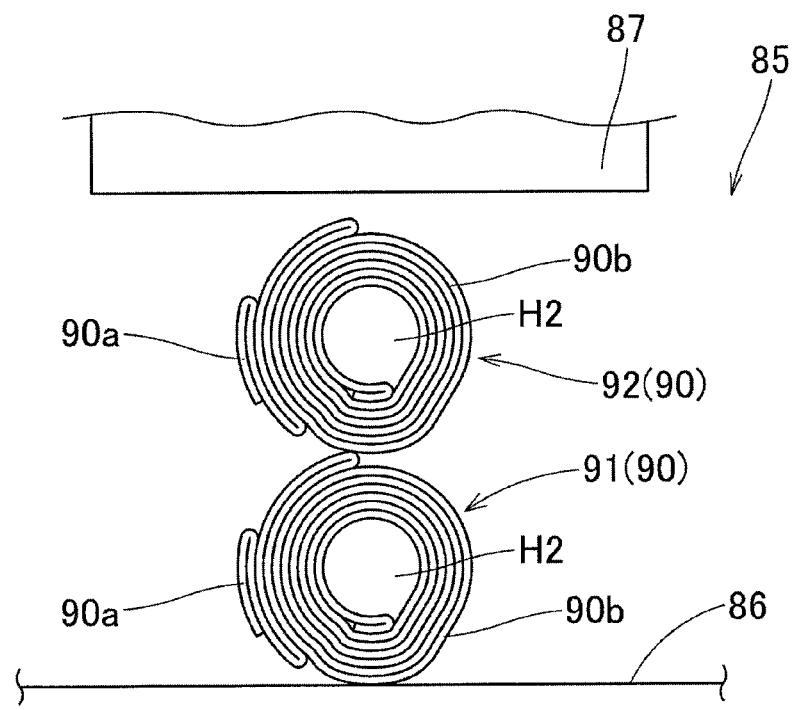
FIGS. 13A and 13B are schematic views illustrating a process to form the compressed portion in the folding process of the airbag of FIGS. 12A to 12C.
Figure 13B:
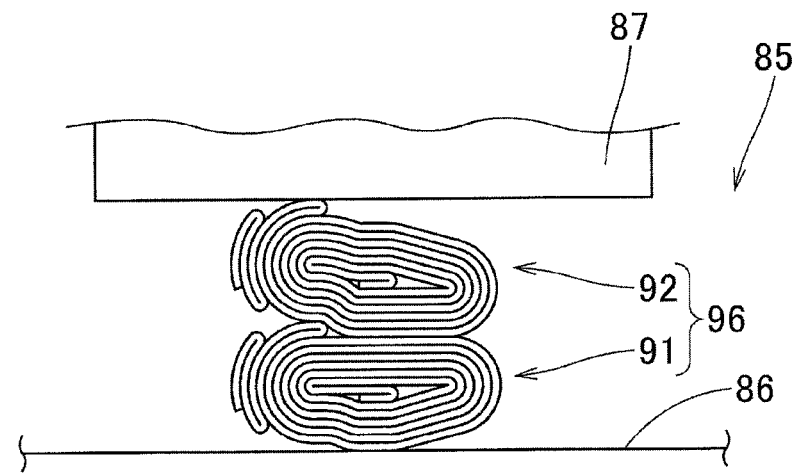

Specifically, the airbag body 21 is folded, in the state of being flatly deployed such that the inboard side wall and the outboard side wall are overlapped, to form the bellows-folded portion 90a and a roll-folded portion 90b similarly with the above-described folding process, whereby a vertically-shortened folded airbag 90 is formed as illustrated in FIG. 12A. The front end 90c of the vertically-shortened folded airbag 90 is folded back to the inboard side I in the crease L5, thereby forming a rod-shaped folded portion 91 (see FIG. 12B). The position of the crease L5 is about the same as that of the crease L1 attached at the time of forming the above-described folding completion body 75. In a state where the rod-shaped folded portion 91 is formed, and the folding target portion 92 overlapped with the rod-shaped folded portion 91 are overlapped to be disposed in parallel to each other in the inboard and outboard direction. Therefore, as illustrated in FIG. 12B, the rod-shaped folded portion 91 has the width dimension in the inboard and outboard direction two times as large as a general portion 93 in the middle in the front and rear direction so as to be considerably bulky. As illustrated in FIGS. 13A and 13B, the rod-shaped folded portion 91 and the folding target portion 92 overlapped with the rod-shaped folded portion 91 are subject to the heat-compressing process by using the airbag heat-compressing machine 85. The hollow H2 in the center of the roll-folded portion 90b is broken to be flat vertically so as to shorten the width dimension in the right and left direction (inboard and outboard direction). When the compressed portion 96 is formed such that a sectional shape in the axis orthogonal direction is small compared to that before the process, the folding completion body 95 can be formed. That is, in the folding completion body 95, the compressed portion 96 includes the rod-shaped folded portion 91 formed by folding back the front end 90c of the vertically-shortened folded airbag 90 in which the lower periphery is brought close to the upper periphery. The rod-shaped folded portion 91 is configured such that the tip 91a extending from the crease L5 is disposed on the front end side of the gas guidance path (not illustrated) similarly with the above-described folding completion body 75. That is, also in the folding completion body 95, the gas guidance path (not illustrated) is configured not to be superimposed with the rod-shaped folded portion 91 in the inboard and outboard direction and to be disposed in a position of being deviated in the front and rear direction.

In the embodiment, the compressed portions 77, 78, and 96 in the folding completion bodies 75 and 95 are formed in a compressing manner to shorten the width dimension in the inboard and outboard direction. However, the compression shape of the compressed portion is not limited to the embodiment. The compression may be performed to shorten the vertical width dimension, and the compression may be performed to shorten the width dimension in the vertical direction and in the right and left direction. In the embodiment, the airbag 20 is folded to shorten the vertical width dimension by being roll-folded and bellows-folded to be wound toward the outboard side. However, the airbag may be configured to be folded over the entire vertical area in the bellows manner. In the embodiment, the airbag 20 is folded to be shortened vertically after being folded to be shortened longitudinally, or is folded to be shortened longitudinally after being folded to be shortened vertically. However, the folding procedure of the airbag is not limited to the embodiment. For example, a portion may be folded to be shortened longitudinally, and be folded to shorten the vertical width dimension. In addition, conversely, a portion may be folded to shorten the vertical width dimension, be folded to shorten the longitudinal width dimension, and then further be folded to shorten the vertical width dimension.

What is claimed is:

1. A folding completion body of a head-protecting airbag which is formed in such a manner that the head-protecting airbag, which has a bag shape inflatable to cover an inboard side of a window of a vehicle when an inflation gas flows inside, is folded to be storable on an upper peripheral side of the window by bringing a lower periphery close to an upper periphery in a flatly-deployed state, the folding completion body comprising:
a compressed portion which is compressed to have a small sectional shape in an axis orthogonal direction in the folding completion body is provided in at least one end in a front and rear direction, wherein:
the head-protecting airbag includes:
a protection inflatable portion which covers the inboard side of the window at the time of the inflation completion; and
a gas guidance path which is disposed substantially in the front and rear direction on the upper peripheral side at the time of the inflation completion, and guides the inflation gas into the protection inflatable portion;
the compressed portion is formed in such a manner that a thin-plate folded portion is disposed by folding back an end periphery in the front and rear direction to be directed to a center in the front and rear direction in a state where the head-protecting airbag is flatly deployed, a folded-up portion in which the lower periphery is brought close to the upper periphery is provided, and the thin-plate folded portion is compressed; and
the thin-plate folded portion is configured such that a tip extending from a crease is disposed to be positioned on an end side of the gas guidance path in the front and rear direction.

2. The folding completion body of the head-protecting airbag according to claim 1, wherein:
the protection inflatable portion includes a main inflatable portion, and a sub inflatable portion which communicates with the main inflatable portion and completes an inflation after the main inflatable portion is completely inflated;
the sub inflatable portion is configured to be disposed in at least one end of the head-protecting airbag in the front and rear direction; and
the crease which folds back the thin-plate folded portion is disposed in an area on an end side of the main inflatable portion in the front and rear direction.

3. The folding completion body of the head-protecting airbag according to claim 2, wherein:
the head-protecting airbag includes:
an airbag body; and
a connection member which is made of a sheet material having flexibility and in which a root is coupled to the airbag body and a tip is fixed to a body of the vehicle in a circumferential periphery of the window separate from one end of the airbag body in the front and rear direction;
the airbag body includes a partition portion which partitions the sub inflatable portion and the main inflatable portion and is coupled with the root of the connection member; and
the compressed portion includes the partition portion coupled with the root of the connection member.

4. A folding completion body of a head-protecting airbag which is formed in such a manner that a head-protecting airbag, which has a bag shape inflatable to cover an inboard side of a window of a vehicle when an inflation gas flows inside, is folded to be storable on an upper peripheral side of the window by bringing a lower periphery close to an upper periphery in a flatly-deployed state, the folding completion body comprising:
a compressed portion which is compressed to have a small sectional shape in an axis orthogonal direction in the folding completion body is provided in at least one end in a front and rear direction, wherein:
the head-protecting airbag includes;
a protection inflatable portion which covers the inboard side of the window at the time of the inflation completion; and a gas guidance path which is disposed substantially in the front and rear direction on the upper peripheral side at the time of the inflation completion, and guides the inflation gas into the protection inflatable portion;

the compressed portion is formed in such a manner that a rod-shaped folded portion is disposed by folding back an end periphery of a vertically-shortened folded airbag in which a lower periphery is brought close to an upper periphery, and the rod-shaped folded portion is compressed; and the rod-shaped folded portion is configured such that a tip extending from a crease is disposed to be positioned on an end side of the gas guidance path in the front and rear direction.

5. The folding completion body of the head-protecting airbag according to claim 4, wherein:

the protection inflatable portion includes a main inflatable portion, and a sub inflatable portion which communicates with the main inflatable portion and completes an inflation after the main inflatable portion is completely inflated;

the sub inflatable portion is configured to be disposed in at least one end of the head-protecting airbag in the front and rear direction; and the rod-shaped folded portion is disposed in an area on an end side of the main inflatable portion in the front and rear direction.

6. The folding completion body of the head-protecting airbag according to claim 4, wherein:

the protection inflatable portion includes a main inflatable portion, and a sub inflatable portion which communicates with the main inflatable portion and completes an inflation after the main inflatable portion is completely inflated;

the sub inflatable portion is configured to be disposed in at least one end of the head-protecting airbag in the front and rear direction; and the crease which folds back the rod-shaped folded portion is disposed in an area on an end side of the main inflatable portion in the front and rear direction.

7. The folding completion body of the head-protecting airbag according to claim 6, wherein:

the head-protecting airbag includes:
 an airbag body; and
 a connection member which is made of a sheet material having flexibility and in which a root is coupled to the airbag body and a tip is fixed to a body of the vehicle in a circumferential periphery of the window separate from one end of the airbag body in the front and rear direction;

the airbag body includes a partition portion which partitions the sub inflatable portion and the main inflatable portion and is coupled with the root of the connection member; and the compressed portion includes the partition portion coupled with the root of the connection member.

* * * * *